Nov. 13, 1962   B. J. BOCKERMAN   3,063,741
YIELDING JOINT FOR EXHAUST PIPES
Filed Oct. 2, 1959   2 Sheets-Sheet 1
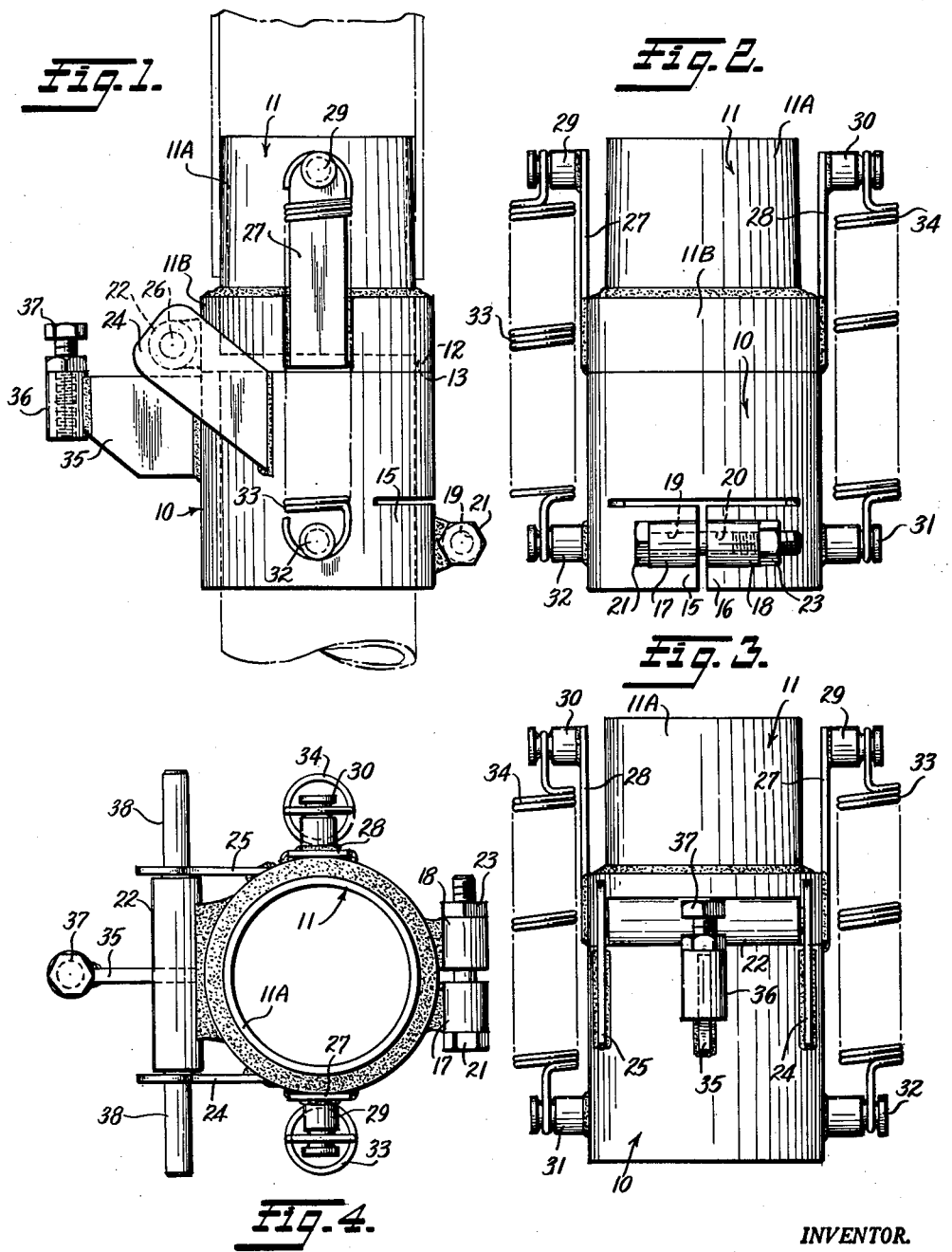
INVENTOR.
Bernard J. Bockerman
BY
Holcombe, Wetherill & Brisebois
ATTORNEYS Nov. 13, 1962  B. J. BOCKERMAN  3,063,741
YIELDING JOINT FOR EXHAUST PIPES
Filed Oct. 2, 1959  2 Sheets-Sheet 2

INVENTOR.
Bernard J. Bockerman
BY
Holcombe, Wetherill & Brisebois
ATTORNEYS

United States Patent Office 3,063,741
Patented Nov. 13, 1962

3,063,741
YIELDING JOINT FOR EXHAUST PIPES
Bernard J. Bockerman, R.R. 1, Prosser, Nebr.
Filed Oct. 2, 1959, Ser. No. 844,091
7 Claims. (Cl. 285—283)

My invention relates to a yielding joint for connecting two cylindrical pipes and is especially designed to provide a yielding joint in the vertical exhaust pipe commonly used on tractors, diesel trucks, and the like in order to conduct the exhaust gases of the engine to a point above the head of the operator and above other vehicles or passersby. If such exhaust pipes are long enough to serve their purpose well, they are also long enough to strike overhanging tree limbs, low bridges, the lintels of barn doors, and other overhead obstructions which may not be noticed by the operator or driver because they are materially above eye level. Since tractors and diesel trucks are relatively heavy and high powered machines, the exhaust pipe is apt to strike the obstruction with considerable force, thus damaging the pipe, and possibly either the obstruction or the manifold to which the exhaust pipe is attached, or both. In the case of light tractors the machine may be overturned or the driver jolted from his seat and injured.

It is accordingly the object of my invention to provide a yielding joint which may be inserted in a vertical exhaust pipe at or near the level of the top of the vehicle to which it is attached. This joint permits the pipe to be bent to an angle up to 90° without damage, and may be so constructed that the upper portion thereof automatically returns to its vertical position when the vehicle has passed the obstruction, and so as to bend either forward or backward. In one form of the invention the upper part of the pipe, when once bent to a 90° angle, will remain horizontal until manually restored to its vertical position.

Two main embodiments of my invention will now be described, purely by way of illustration, with reference to the accompanying drawings in which:

FIGURE 1 is a vertical elevation showing a first embodiment of my invention;

FIGURE 2 is a second vertical elevation looking toward the right side of FIGURE 1;

FIGURE 3 is a third vertical elevation looking toward the left side of FIGURE 1;

FIGURE 4 is a top plan view of the embodiment shown in FIGURE 1;

Like reference characters denote like parts throughout the several views.

Figure 5:
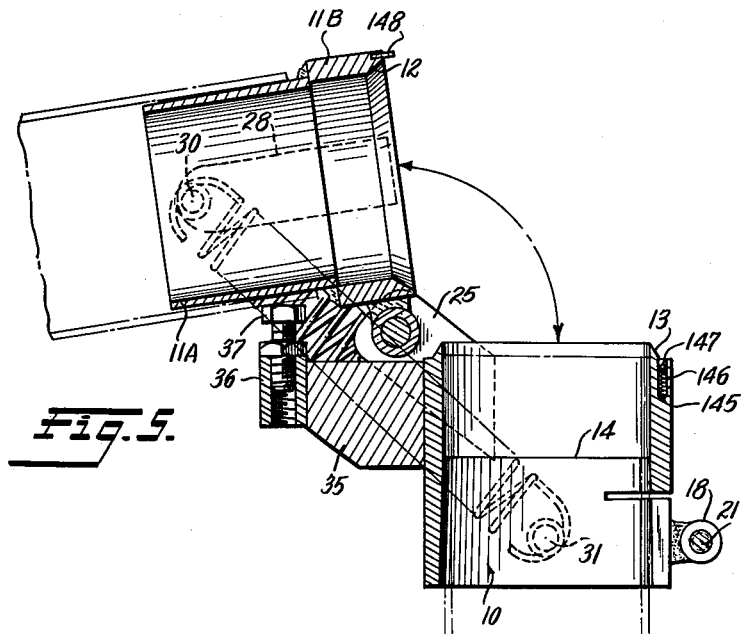
FIGURE 5 is a longitudinal cross-section through the central axis of the embodiment shown in FIGURE 1, taken in a plane parallel to that of FIGURE 1, but showing the socket members swung apart.

Referring now to FIGURE 1 it will be seen that my joint comprises a lower cylindrical socket member 10 adapted to fit over the upper end of a short vertical exhaust pipe, indicated in dotted lines, and an upper cylindrical socket member 11 adapted to fit into the lower end of a vertical extension of the exhaust pipe. The adjacent edges of these two cylindrical socket members are tapered at 12 and 13 so that one fits snugly within the other, thereby preventing the escape of exhaust gases therebetween. This taper also serves as locating means when the two socket members are brought together.

The inner bore of the lower socket member 10 also tapers, but very slightly, from its lower edge upward to a point 14 about midway thereof, so that it has a tendency to jam onto the upwardly projecting exhaust pipe below it. The lower member 10 may be provided with additional means for securing it to the exhaust pipe. This may take the form of a T-shaped cut in the lower part of this member which creates two flaps 15 and 16 having adjoining ends which have been cut free from the member 10. These flaps may be provided with protuberances 17 and 18 pierced by longitudinally aligned bores 19 and 20. A bolt 21 passes through these bores and a mating nut 23. Tightening of this nut on the bolt serves to tighten the flaps 15 and 16 against the exhaust pipe section within the lower member 10. A pair of aligned projecting wings 24, 25 extend outwardly from the lower member 10 and the two opposite ends of pivot pin 26 are seated in these wings. A sleeve 22 encircles pin 26 and is fixed to the upper member 11. (It will be appreciated that the sleeve may turn upon the pin, if the pin is fixed to the wing members, or the pin may be fixed to the upper member and rotatably mounted in the wing members. Moreover, the wings may be mounted on the upper member and the sleeve on the lower member.) The upper socket member comprises an upper section 11A and a lower section 11B. The outer diameter of the upper section is less than that of the lower section so as to fit within the lower end of the upper part of the exhaust pipe (shown in dotted lines). It may also be slightly tapered to provide a tight force fit.

Two vertical bars 27, 28 extend upwardly from the lower section 11B of the upper member 11. Projections 29, 30 extend outwardly from the upper ends of bars 27 and 28 respectively and aligned projections 31, 32 extend radially outward from the lower member 10. These projections are provided with suitable slots or grooves for receiving and retaining the ends of longitudinally extending compression springs 33, 34.

As an optional feature the lower cylindrical member 10 may be provided with a radially projecting arm 35 carrying an enlargement 36 at its outer end. This end may be vertically bored and threaded to receive a bolt 37.

In order to use my device, a conventional vertical exhaust pipe is, if necessary, cut in two at any suitable height, presumably at a height approximating that of the top of the tractor or other vehicle. The lower member 10 is then slipped over the upper end of the portion of the exhaust pipe remaining attached to the vehicle, with pivot pin 26 toward the rear of the vehicle and bolt 21 is tightened up. The upper section of the exhaust pipe is then slipped over the upper member 11. If at any time thereafter the upper part of the exhaust pipe strikes an overhead obstruction, during forward movement of the vehicle, the upper exhaust pipe portion and the upper socket member 11 will simply pivot backward about the pivot pin 26 until it strikes the end of bolt 37, which may be adjusted in the threaded bore of the enlargement 36 to a height sufficient to prevent the exhaust pipe from striking and damaging any part of the vehicle or tractor, or any person who may be driving.

In the embodiment thus far described, the upper portion of the exhaust pipe must then be manually returned to its vertical position, since the springs 33, 34 will have swung past the pivot pin 26 and tend to hold the upper exhaust pipe in its horizontal position. The wings 24, 25, may, however, be provided with projections 38 (shown in FIG. 4 only) which extend outwardly in alignment with the pivot pin 26 into the paths followed by the springs 33, 34 as the upper section pivots about pin 26, or the pin 26 itself may extend through and beyond the wings 24, 25. In either case, the springs are prevented from swinging past the pivot pin and consequently urge the upper socket member and exhaust pipe portion back to a vertical position whenever they are swung away from that position. A like result may be achieved by placing the spring carrying projections so close together that the springs never swing past the pivot pins. Projections 31, 32 may take the form of movable pins so that the joint may be made to stay in open position, or return automatically, as desired, simply by adjusting the position of the springs.

While the embodiment of my invention hereinbefore described is adequate for use in connection with vehicles which rarely have occasion to back up, it is obvious that it would be useless if the exhaust pipe were to encounter an overhead obstruction when the vehicle was in reverse. For vehicles used in such types of operation, as for instance farm tractors, I have devised a second embodiment which is adapted to yield if the upper portion of the exhaust pipe strikes an obstruction while proceeding in either direction.

Figures 6, 7:
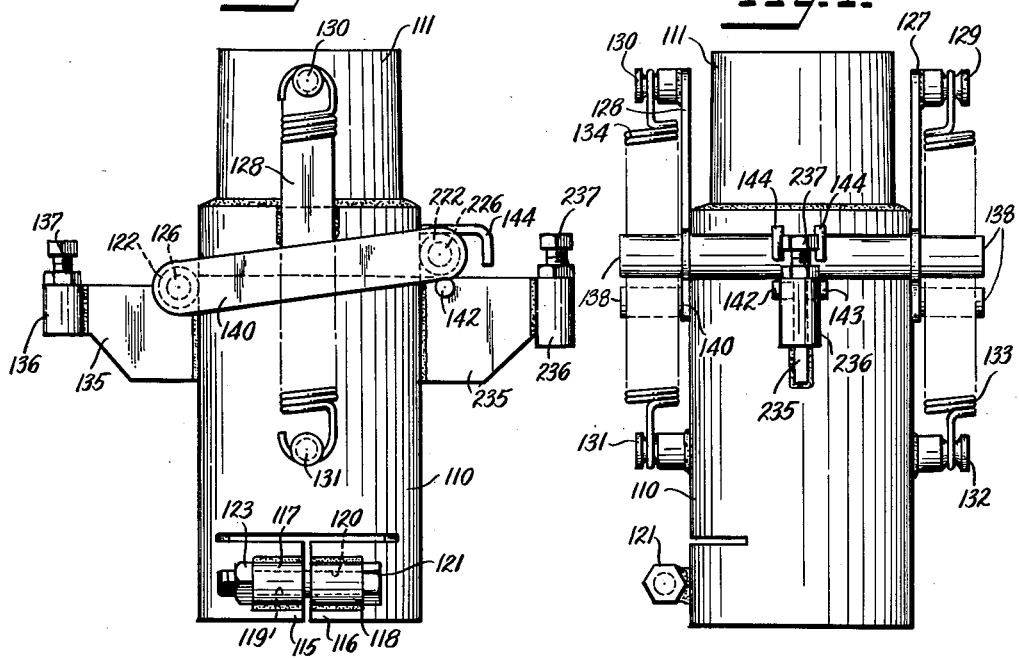
FIGURE 6 is a vertical elevation showing a second embodiment of my invention.
FIGURE 7 is a second vertical elevation of this second embodiment, looking toward the right side of FIGURE 6.

In this embodiment, which is shown in FIGS. 6 and 7 reference numerals 110 and 111 indicate lower and upper mating socket members like those previously described in connection with the first embodiment. The lower socket member 110 may be provided with tightening means 115, 116, 117, 118, 119, 120, 121, and 123 corresponding to 15, 16, 17, 18, 19, 20, 21, and 23 of the first embodiment, and be tapered in like manner. The upper socket member is provided with vertical bars 127, 128 carrying projections 129, 130, and the lower socket member carries axially aligned projections 131, 132. Compression springs 133, 134 are stretched between each pair of axially aligned projections. The lower socket member may also carry two arms 135 and 235 provided with vertically bored enlargements 136 and 236, which are threaded to receive bolts 137 and 237. These arms and bolts serve the same purpose as arms 35 and bolts 37 on the first embodiment.

The lower socket member 110 carries a transverse sleeve 122 welded to the exterior thereof, and the upper socket member carries a similar transverse sleeve 222 on the opposite side of the axis of the longitudinal axis of the joint from the sleeve 122. Pivot pins 126 and 226 are rotatably mounted in these sleeves, and seated at their ends in links 140 and 141. The links may or may not be provided with projections 138 in alignment with pins 126 and 226, depending on whether or not it is desired to have the upper part return automatically to a vertical position after it has been deflected. Projections 138 are shown in FIGURE 7, but have been omitted from FIGURE 6 in order that the pivot pins 122 and 222, together with the sleeves 126 and 226 might be shown thereon in dotted lines.

Abutments 142 and 143 may be provided on opposite sides of arm 235. When the upper socket member pivots about pivot pin 226, claws 144 fixed to sleeve 222 catch under these abutments and prevent the upper socket member from being longitudinally separated from the lower socket member, due to leverage about the stop 237.

Any suitable shock absorbing means for cushioning the shock of snapping together the upper and lower socket members may be employed in connection with either embodiment.

For instance, as shown in FIGURE 5, one or more holes 145 may be drilled in the walls of the lower socket members and a small coil spring 146 supporting ball 147 may be inserted in these holes. The upper socket member may be provided with mating pins 148 adapted to seat in these holes when the two socket members approach each other.

While the specfic embodiments of my invention thus far described have used compression springs stretched between projections on the two socket members, it will be appreciated that other spring arrangements for biasing these two members together may be employed. For instance, a strong leaf spring may be connected to exert upward and forward pressure on the upper socket member, or a torsion spring may be coiled about the pivot pin or pins so as to bias the socket members toward each other. Other substitutions of mechanical equivalents may be made without thereby departing from the spirit of my invention as defined by the following claims.

What I claim is:

1. A joint for a vertical exhaust pipe comprising upper and lower cylindrical socket members having sections of equal internal diameter, first pivot means mounted on one side of said lower socket member and second pivot means mounted on the opposite side of said upper socket member, connecting links pivotally connected at opposite ends to said first and second pivot means so that said upper socket member can pivot on either of said pivot means between a closed position in which said socket members are in alignment and an open position in which said socket members are at an angle to each other, and resilient means biasing said socket members toward said closed position, those rims of said socket members which are adjacent in said closed position being matingly tapered to permit one rim to be received within the other.

2. A joint as claimed in claim 1 in which said spring means comprises two parallel coil springs extending longitudinally along opposite sides of said socket members, one end of each spring being attached to each socket member, the points of attachment of each spring to said socket members being so spaced that a straight line therebetween lies on the side of one of said pivot means away from said socket rims whenever said upper socket member is in an angular position more than a predetermined number of degrees away from said closed position, that said spring will then bias said joint toward open position.

3. A joint as claimed in claim 2 which is provided with oppositely disposed radial projections which extend outwardly in the directions in which said upper socket member swings, said projections carrying vertically adjustable stop means limiting the arcuate movement of said upper socket member.

4. A joint as claimed in claim 3 in which said upper socket member carries a downwardly curving claw which extends beyond the pivot means attached thereto, and the radial projection therebeneath carries at least one transverse abutment beneath which said claw engages as said upper member pivots toward it.

5. A joint as claimed in claim 1 provided with projections in alignment with said pivot means extending into the path taken by said springs when said upper socket member pivots from its closed toward its open position, so that said springs always urge said upper socket member toward its closed position.

6. A joint as claimed in claim 1 in which the interior of at least one of said socket members tapers slightly inward from the rim remote from the other socket toward its midpoint and is provided with means for tightening it onto an exhaust pipe.

7. A joint as claimed in claim 1 in which the interior of the lower socket member tapers slightly inward from the rim remote from the other socket toward its midpoint and is provided with means for tightening it onto an exhaust pipe.

References Cited in the file of this patent

UNITED STATES PATENTS

| | | |
|---|---|---|
| 304,739 | Larson | Sept. 9, 1884 |
| 448,456 | Ruge | Mar. 17, 1891 |
| 681,577 | Pomeroy et al. | Aug. 27, 1901 |
| 1,364,529 | Thomas | Jan. 4, 1921 |
| 1,527,310 | Kingbach | Feb. 24, 1925 |
| 1,997,292 | Baker | Apr. 9, 1935 |
| 2,052,713 | Juffa | Sept. 1, 1936 |
| 2,446,327 | Heinrich | Aug. 3, 1948 |
| 2,602,684 | Pinke | July 8, 1952 |
| 2,834,277 | Tanke | May 13, 1958 |